United States Patent [19]

Stahl

[11] Patent Number: 5,436,789
[45] Date of Patent: Jul. 25, 1995

[54] SIGNAL-CHANGE SURVEILLANCE EQUIPMENT, IN PARTICULAR FOR USE IN SELF-CHECKING CONTROL SYSTEMS

[75] Inventor: Kurt Stahl, Gummersbach, Germany

[73] Assignee: Square D Company (Deutschland) GmbH, Germany

[21] Appl. No.: 45,139

[22] Filed: Apr. 12, 1993

[30] Foreign Application Priority Data

Apr. 13, 1992 [EP] European Pat. Off. ............ 92106335

[51] Int. Cl.6 .............................................. H01H 47/22
[52] U.S. Cl. ..................................... 361/179; 361/190; 361/189
[58] Field of Search .................... 361/189–193, 361/179–181; 307/326, 328; 192/129 A

[56] References Cited

U.S. PATENT DOCUMENTS

| | | | |
|---|---|---|---|
| 3,089,985 | 5/1963 | Camfield et al. | 361/189 |
| 4,392,176 | 7/1983 | Kneip et al. | 361/189 X |
| 4,775,913 | 10/1988 | Ekblad | 361/189 X |

Primary Examiner—Brian K. Young
Assistant Examiner—Fritz M. Fleming
Attorney, Agent, or Firm—Diller, Ramik & Wight

[57] ABSTRACT

Surveillance of signal changes, especially for self-checking control systems. It is essential in self-checking control systems to create equipment to monitor signal changes and allowing to detect all conceivable initial errors or defects and to allow beginning a dangerous state or a dangerous motion of a machine only when the input peripherals evince, not only for instance static signals, but after definitively at least one change of signal has taken place and after this input signal was successfully checked dynamically for its suitability in beginning the dangerous state or the dangerous motion of a machine. For that purpose a special circuitry is proposed in which at least one signal source as well as relays and relay contacts are arrayed in such manner that both self-checking signal detection and voltage-free transfer of at least one checked signal to a higher safety level shall take place.

5 Claims, 1 Drawing Sheet

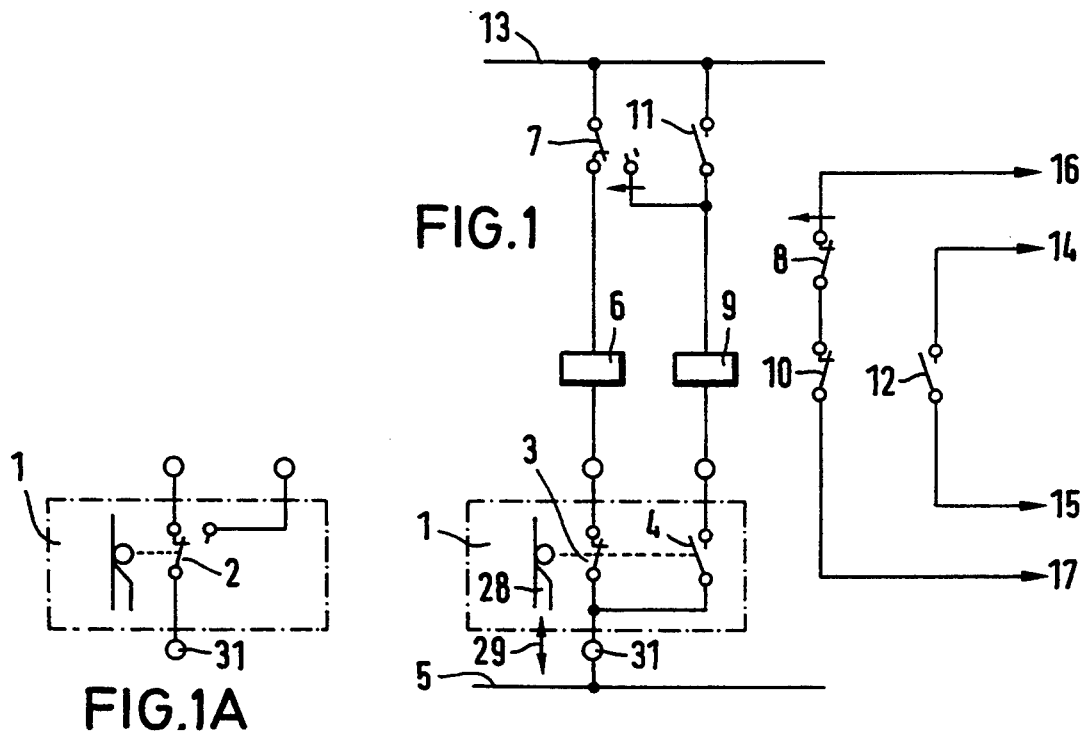
FIG.1
FIG.1A
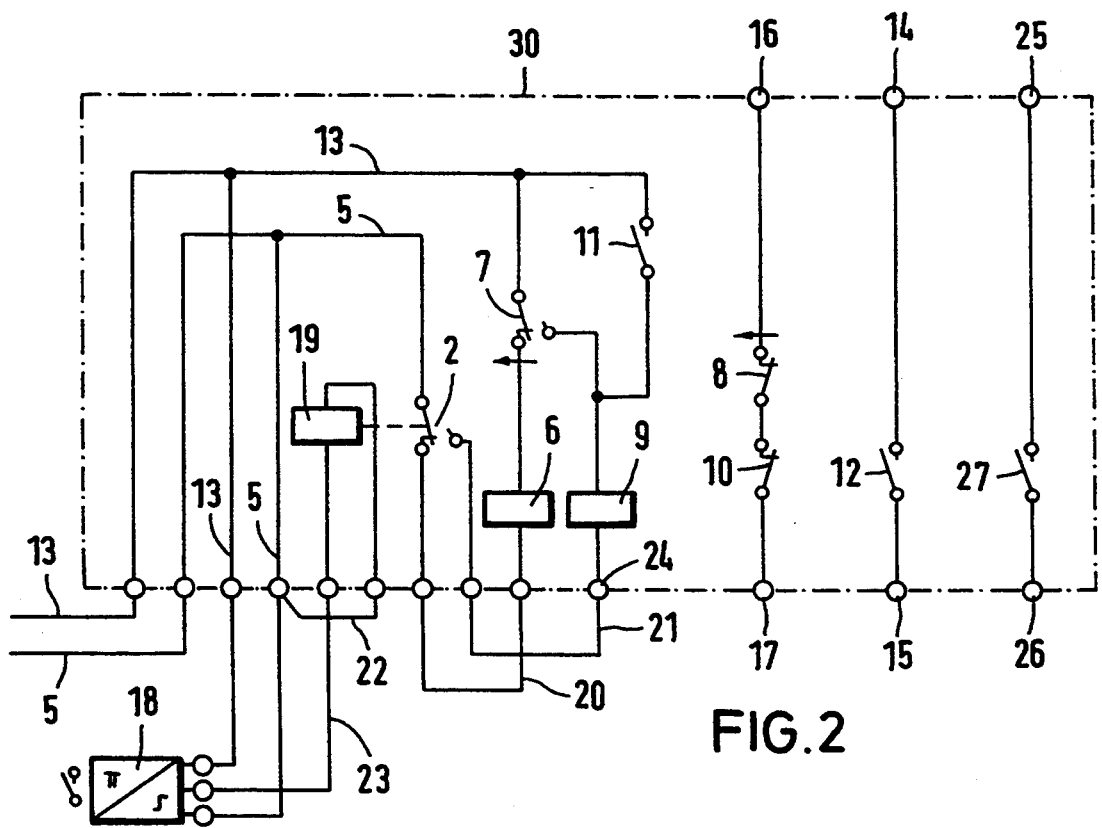
FIG.2

SIGNAL-CHANGE SURVEILLANCE EQUIPMENT, IN PARTICULAR FOR USE IN SELF-CHECKING CONTROL SYSTEMS

BACKGROUND OF THE INVENTION

The present invention relates to equipment for monitoring changes and signals, particularly for self-checking control systems which are used in protecting personnel and/or machinery.

When machine control systems operate improperly, dangerous movement(s) and/or dangerous conditions can occur. Such dangerous conditions or machine movement(s) might occur because of one or more changes in a machine control signal (or signals) at a peripheral input (or inputs) of an associated machine, and in order to prevent the latter, relatively reliable surveillance circuits are utilized with such machines/machinery. Such surveillance circuits are designed to preclude unexpected or unintended situations, such as self-starts of one or more machines or machine parts, collisions between machine parts, etc. This is particularly the case in a wide field of machinery which perform dangerous motions from which personnel must be kept away or, if personnel are adjacent thereto, normally "safe" space between such machines can become dangerous if one or more machines self-starts. Thus, machines of this type can only be activated in the area of working personnel when it is reliably assured that the machinery will not be unintentionally started.

Conventional surveillance circuits attempt to solve the aforesaid problems through so-called safety components, such as safety limit-switches, which attempt to preclude all, most of, or at least certain fractions of erroneous machinery malfunctions, such as unintentional start-up. Such safety components are, however, only partly successful because of inherent though subtle errors created at hook-up lines and terminals which are not or cannot be detected by the safety components. This means that machinery input signals which are generated solely by such safety components may themselves nevertheless be erroneous.

As a rule, signals from ambient, periphery or safety equipment are required for accident protection/prevention, and these signals must be essentially error free to reliably detect any errors in so called redundant or automatic machine controls, and to transfer a recognized dangerous machine control signal into a safe state.

For the sake of clarity, two typical applications of the present invention will be described hereinafter relating to hydraulic presses, but other applications will be readily apparent to persons skilled in the art and are within the scope of the present invention.

Hydraulic presses include a number of switches used for selecting particular modes of operation, such as speed or power adjustment, stroke adjustment, single stroke operation, two-hand operation, single foot operation, etc. However, in the case of a hydraulic press which is operated by a single-stroke foot control, a command/signal may never be carded out. If, for example, an associated selection switch of the hydraulic press must be moved to a single-stroke foot operation position, but is not so moved, the foot operation single-stroke mode is not selected and even if the foot pedal is depressed, the command/signal will not be generated.

As another example, hydraulic presses are predominantly fitted with spring operated restoring multi-position valves. These multi-position or multi-way valves are generally mounted in series for redundancy to create a safety hydraulic system, and the valve plungers thereof can be appropriately scanned with respect to their blocking positions. As a rule, two such multi-way valves are provided. A break of the plunger return-spring in one of the two valves might allow the valve plunger to move from its blocking position and at least partially let hydraulic fluid flow therethrough. Therefore, even in spite of series valve redundancy, the latter defect would not be initially noted so long as the second valve is operating properly. However, should the plunger return spring of the second valve break, there would be an uncontrolled flow of hydraulic fluid which would no longer be shut-off completely and reliably because both safety valves are essentially inoperative. This could cause dangerous motion of the hydraulic press, yet in such conventional safety systems the associated electrical safety circuit is operative only when the valve plungers of both valves have totally left their blocking positions, not any interim position. This might cause displaceable protective screens or doors associated with hydraulic presses to be inoperative and a person could thereby be severely damaged should a press move in the absence of the protective screen/door preventing access to the work area of the press.

SUMMARY OF THE INVENTION

In keeping with the foregoing, a primary of the present invention is to provide a novel monitoring system which senses signal changes and detects all conceivable initial errors/signal errors and permit the initiation of what might otherwise be a dangerous machine motion only when, in the first place, more than static signals are present at the peripherals, but also when at least one definitive signal change has taken place at the peripheral, and after this input signal is successfully tested for its relevance, initiate (or not) the dangerous machine motion or dangerous state or condition thereof.

The control system of the present invention offers the essential advantage that selfchecking signal detection and processing and voltage-free transfer of at least one check signal to a higher safety level is effected.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a circuit diagram, and illustrates the basic electric circuit of the present invention. FIG. 1A is a circuit diagram, and illustrates a signal source which includes a changeover switch.

FIG. 2 is another circuit diagram, and illustrates the complete electric circuit of the present invention.

DESCRIPTION OF THE PREFERRED EMBODIMENTS

FIG. 1 illustrates a basic electric circuit of the present invention which includes a signal source 1. The signal source 1 may be a simple position switch controlled or driven by a switching cam 28 which can be moved in opposite reciprocal directions, as indicated by the double-headed arrow 29. The signal source 1 may include a changeover switch 2, as shown in FIG. 1A or as shown in FIG. 1, with one normally closed contact 3 and one normally open contact 4. A common terminal or point 31 of the contacts 3, 4 are connected with a lower line 5 of an electric supply 5, 13 which in turn is connected to a suitable source of electric power (not shown). The normally closed contact 3 is connected to one end of a coil of an inverting single-pulse actuated relay 6 which defines a predetermined pulse width. The inverting single-pulse actuated relay 6 includes a relay contact 7 and an additionally normally closed relay contact 8. The normally open contact 4 of the signal source 1 is connected to the end of a coil of another relay 9 which includes a normally closed contact 10 and two normally open contacts 11 and 12. The contacts 10, 11 and 12 of the relay 9 and the contacts 7 and 8 of the inverting single-pulse actuated relay 6 are ganged.

Another end of the inverting signal-pulse actuated relay 6 is connected through a normally closed contact 7 to an upper line 13 of a electric supply line 5, 13. The normally open contact 4 of the normally closed changeover contact 3 is connected to a second coil end of the relay 9. The latter coil end is also connected in parallel through its own self-latching contact 11 which when closed is electrically connected to the upper line of the electrical supply 13. The normally open contact 12 of the relay 9 is part of the safety circuit generally designated by the reference numerals 14 and 15 which directly cooperate with an unillustrated releasing circuit of an associated control system. The normally closed contact 8 of the inverting single-pulse actuated relay 6 and the normally closed contact 10 of the relay 9 are present in the feedback circuit generally designated by the reference numerals 16, 17.

In the rest position of the operation of the system shown in FIG. 1, the coil of the inverting single-pulse actuated relay 6 is directly connected to the lines 5 and 13 of the electrical supply 5, 13. By actuating the position switch 1, for instance, by means of the switching cam 28, the normally closed contact of the switch 3 will open or in the case of the changeover switch 2, the latter's normally closed contact will open. Furthermore, the normally open contact 4 or the normally open contact of the changeover switch 2 will be closed. By opening the normally closed contact 3, the inverting single-pulse actuated relay 6 is energized for the duration of the defined single pulse and the changeover contact 7 of the inverting single-pulse actuated relay 6 applies the voltage from the upper supply line 13 to the coil end of the relay 9. The relay 9 is also connected by its other coil end through the contact 4 of the position switch 1 to the lower supply line 5. In this fashion, the relay 9 is turned ON and is connected by its own contact 11 to the upper supply line 13. They thus become self-latching and, hence, also become independent of the pulse width of the inverting single pulse actuated relay 6. Self-latching of the relay 9 lasts as long as the position switch 1 is actuated. As a result, the so-called safety circuit 14, 15 is held closed by the contact 12 of the relay 9. The safety circuit 14, 15 cooperates directly with the omitted release circuit of the system controlling dangerous motion of a machine or machinery parts.

As a rule, such control systems which are known per se are equipped with a so-called feedback circuit 16, 17 consolidating the peripheral start conditions to initiate the dangerous motion. The circuit 16, 17 is shown in a simplified manner in FIG. 1 and is part of a feedback circuit that includes the normally closed contact 8 of the inverting single-pulse actuated relay 6 and the normally closed contact 10 of the relay 9. A control system command to start a dangerous motion cannot begin when the inverting single pulse actuating relay 6 or the relay 9 are erroneously turned ON by previous activation or by handling and keep the circuit 16, 17 open by means of the contact 8 and/or 10 at the time of machine starting. Therefore, in the design of the invention the check on the return of the positions switch 1 is periodically constrained by means of the inverting single pulse actuated relay 6 in the course of the operational cycle.

The signal source 1 shown in FIG. 1 may be more than a mere position switch, and instead may also incorporate selectively a limit switch or a proximity switch or a sensor or another suitable pick-up.

Reference is now made specifically to FIG. 2 which shows a complete electric circuit of the apparatus of the invention. In principal, the circuit of FIG. 2 is the same as that shown in FIG. 1 and, therefore, the same reference numerals as are used in FIG. 1 are used for the same or equivalent components in FIG. 2. As indicated by the reference numeral 30 in FIG. 2 and by the dash/dot line the surveillance circuit of FIG. 2 is mounted in a sealed housing 30 which is normally relatively inaccessible. The relays 6 and 9 and a further relay 19 with all of their associated relay contacts are housed within the housing 30. The housing 30 includes housing terminals 24 for external hook-ups. The hook-up terminals 24 are shown by several unnumbered partially black circles located on the dash-dot lines, as is exemplified by the reference numeral 24 in FIG. 2.

The external position switch 1 shown in FIG. 1 is replaced in the circuit of FIG. 2 by an internal miniature relay 19 which comprises a changeover contact 2, as shown in the left side of FIG. 1. The changeover contact 2 fulfills the same function in the circuit of FIG. 2 as the position switch 1 of FIG. 1. The input signal can be generated by a single contact, an arbitrary sensor or, as shown in FIG. 2, by a proximity switch 18 as the signal source. FIG. 2 also shows an external line jumper 22 which applies fixed supply voltage to one end of the miniature relay 19 connected to the lower supply line 5 (or to the upper supply line 13). Conventional pnp or npn transistors can be used as the proximity switches 18. Basically an npn transistor includes two outer negative n conductors sandwiching a positive p conductor with boundary layers therebetween. On the other hand, a pnp transistor includes two outer positive conductors p and a sandwiched n conductor therebetween. In a npn transistor the load is between positive pole and the output, while in a pnp transistor the load is between the negative pole and the output. Both designs can be used for normally open and normally closed switch functions. As further shown in FIG. 2, the line 23 at the other outward spool end detects the actual input signal from the proximity switch 18 or from an associated sensor or initiator for driving the relay 19.

When selecting the function of the input signal at the proximity switch 18 as being normally open or normally closed and by interchanging the two external wire connections 20 and 21 at the terminal coils of the relays 6 and 9, one may determine whether a signal change from LOW to HIGH or from HIGH to LOW is to be monitored. As is further illustrated in FIG. 2, a further normally open contact 27 is present in the relay 9 and forms a further voltage-free circuit 25, 26 which monitors, if and when needed, two separate safety pertinent electric circuits of the machine control, for instance, forward motion or rearward/backward motion.

The operation of the circuit of FIG. 2 is comparable to that heretofore described relative to FIG. 1. However, a signal source 18 is assumed to be in the form of a pnp proximity switch, such as a normally open three conductor type, which when its internal frequency drops, causes energization of the miniature relay 19. The miniature relay 19 is connected to a power source through the line 23 and to the lower supply line 5 through the jumper 22. The coil of the inverting single-pulse actuated relay 6 is powered through the inactive changeover switch 2 and its own changeover contact 7. The changeover switch 2 is switched when the coil of the miniature relay 19 is energized and one end of the relay 9 is connected through the line 21 to the lower supply line 5. At the same time, the changeover contact 7 of the inverting single-pulse actuated relay 6 connects the other coil end of the relay 9 to the potential of the upper supply line 13. As a result, the relay 9 is energized and becomes self-latching by means of its own normally open contact 11. This self-latching is retained as long as the frequency drop is maintained in the proximity switch 18. When the relay 9 is energized, the contacts 12 and 27 in the output circuits 14, 15 and 25, 26 close. On the other hand, the circuit 16, 17, which represents the feedback circuit of the control system, does not allow turning ON the dangerous machine motion when the normally closed contact 8 of the inverting single-pulse actuated relay 6 and the normally closed contact 10 of the relay 9 have not open upon de-energizing following a switching process. As a result, self-checking surveillance of signal detection and signal monitoring sets in.

Though the basic circuit is shown in FIG. 2 mounted within a housing 30, many variations are possible relative thereto and are illustrated in FIGS. 3 through 12. Numerous signal sources other than the particular proximity switch 18 of FIG. 2 can Although a preferred embodiment of the invention has been specifically illustrated and described herein, it is to be understood that minor variations may be made in the apparatus without departing from the spirit and scope of the invention, as defined the appended claims.

What is claimed is:

1. Signal change surveillance equipment comprising at least one signal source (1, 18) including a changeover switch (1) having one of a normally closed and open contact (2) and a normally-closed and normally-open contact (3,4) of which a junction (31) is connected to a supply line (5), the normally-closed contact (2, 3) of the signal source (1, 18) being connected to one coil end of an inverting, single-pulse actuated relay (6) of a defined pulse width, said relay (6) including a changeover contact (7) and an additionally normally-closed contact (8), the normally-open contact (2, 4) of the signal source (1, 18) being connected on one end of a coil of a further relay (9) comprising one normally-closed contact (10) and two normally-open contacts (11, 12), the normally-closed contact (10) and the normally-open contacts (11, 12) of the relay (9) and the contacts (7, 8) of the inverting, single-pulse actuated relay (6) being ganged, another end of the coil of the inverting, single-pulse actuated relay (6) being connected through its own changeover contact (7) to another supply line (13) and a normally-open contact of said last-mentioned changeover contact (7) being connected to the other end of the coil of the relay (9), said latter coil end being connected in parallel through its own self-latching contact (11) to the other supply line (13), the normally-open contact (12) of the relay (9) being in a safety circuit (14, 15) and the normally-closed contact (8) of the inverting, single-pulse actuated relay (6) and the normally-closed contact (10) of the relay (9) being in a feedback circuit (16, 17).

2. Equipment defined in claim 1, characterized by a sealed housing (30) housing all relays (6, 9; 19) with their relay contacts and fitted with housing hookup terminals (24) for external hookup.

3. Equipment defined in claim 1, characterized in that the signal source (1, 18) selectively comprises one of a position switch and a proximity switch.

4. Equipment defined in claim 1, characterized in that wiring means (20, 21) of the respective relays (6, 9) are interchangeable for the selective surveillance of signal changes from LOW to HIGH or from HIGH to LOW.

5. Equipment defined in claim 1, characterized in that the relay (9) comprises a further normally-open contact (27) present in a further voltage-free safety circuit (25, 26).

* * * * *